United States Patent [19]
Larsen et al.

[11] 3,794,949
[45] Feb. 26, 1974

[54] SOLID STATE MOTOR STARTING APPARATUS

[75] Inventors: Odd Larsen, Kenyon, R.I.; Carl N. Johnson, Bridgewater, Mass.

[73] Assignee: Texas Instruments Incorporated, Dallas, Tex.

[22] Filed: Feb. 1, 1973

[21] Appl. No.: 328,553

[52] U.S. Cl. .......................... 338/22 R, 310/68 C
[51] Int. Cl. ............................................... H01c 7/04
[58] Field of Search ........ 338/22, 23, 25; 310/68 C; 318/471–473

[56] References Cited
UNITED STATES PATENTS

| | | | |
|---|---|---|---|
| 3,695,054 | 10/1972 | Barry | 318/473 X |
| 2,376,863 | 5/1945 | Bussmann | 318/473 X |
| 2,417,912 | 3/1947 | Clark | 318/473 X |
| 2,523,059 | 9/1950 | Richert et al. | 310/68 C |

Primary Examiner—C. L. Albritton
Attorney, Agent, or Firm—John A. Haug; Edward J. Connors, Jr.; James P. McAndrews

[57] ABSTRACT

A motor starting switch providing a predetermined time delay before permitting reenergization of a motor upon deenergization thereof comprises a generally cup-shaped casing having an open end adapted to receive a single or dual solid state starting elements. The dual elements are adapted to be coupled in series or parallel electrical circuit relation. An electrically conductive clip is disposed at the open end of the casing and provides electrical contact, serves as a casing half and maintains a mechanical bias on the solid state starting elements. The switch is provided with plug on terminals so that the switch can be directly plugged into a motor for starting thereof.

15 Claims, 18 Drawing Figures

SOLID STATE MOTOR STARTING APPARATUS

This invention relates generally to motor control systems and more particularly to a solid state device for controlling the power supplied to the windings of an electric motor. In various types of electric motors such as single phase a.c. motors a pair of windings are typically employed connected in parallel relationship with each other and are commonly identified as the start winding and the run winding. Such motors typically require certain types of starting systems including switching devices for energizing and deenergizing the start winding. Typically during starting of such motors the start winding is energized as well as the main winding during the motor starting period, while the start winding is substantially deenergized as the motor approaches its running speed.

Electromechanical relays are available for starting such motors as shown for instance in U.S. Pat. Nos. 3,323,086 and 3,099,725 assigned to the assignee of the present invention. In relays of this type some parameter is sensed, such as main winding current, and the state of energization of the start winding is effected upon realization of a predetermined level of the parameter. As shown in the above-referenced patents a solenoid is energized by main winding current when it reaches a predetermined level causing a movable contact to move thereby deenergizing the start winding.

The provision of such devices has however, presented certain problems in view of the inherent unreliability of mechanical switching devices when exposed to the adverse environment associated with continual opening and closing of the contacts and the accompanying sparking and arcing. As a result rapid wear and degradation of the contacts may occur necessitating frequent replacement as well as presenting a potential danger of motor failure. In copending, coassigned application Ser. No. 132,846 filed Apr. 9, 1971, a plurality of resistance elements each possessing a resistance characteristic having a positive temperature coefficient and a sharply defined transition temperature above which the resistance of the element increases relatively abruptly, hereinafter referred to as PTC elements, are employed to provide a switching device permitting energization of the start winding of the motor for a predetermined time interval sufficient for the motor to approach running speed at which time the transition temperature of the PTC elements is approached causing the resistance thereof to increase rapidly thereby blocking continued current flow therethrough essentially deenergizing the start winding. These elements have proven to be very effective, are less expensive, more reliable and longer lived than the electromechanical relays they replaced. For many applications, particularly when the PTC starting device is coupled across a run capacitor where voltage developed across the PTC device may approach values in excess of twice the line voltage it may be desirable to use a plurality of PTC elements, however for other applications it may be desirable to employ but a single PTC element. Further, if a plurality of pills are employed it may be desirable to connect them either in series or in parallel circuit relationship.

It is therefore an object of the invention to provide a solid state motor starting device which can accommodate single or multiple PTC elements. Another object is the provision of a housing in which single or dual PTC elements may be disposed which is inexpensive to produce, one which will readily enable dual PTC elements to be electrically connected in series or parallel circuit relationship and one which can be directly plugged onto a motor for starting thereof. Another object is the provision of a starting device which, after being previously energized, provides a predetermined time delay upon deenergization before the motor can be reenergized. Various additional objects and advantages will become readily apparent from the following detailed description.

The invention accordingly comprises the elements and combination of elements, features of construction and manipulation and arrangements of parts, all of which will be exemplified in the structure hereinafter described, and the scope of the application of which will be indicated in the appended claims.

Briefly, the realization of these objects are obtained by providing a cup-shaped electrically insulative casing having an open end which receives PTC elements therein. An electrically conductive clip is disposed over the open end of the casing and is provided with two slotted end portions which fit over ears in the casing wall to anchor the clip in location with a bias applied to the PTC elements. The casing can accommodate various bayonet type contact-terminals which facilitate electrical connection of a single element or of dual elements in series or in parallel circuit relationship. The casing also includes female plug-on pin connectors connectable to the bayonet type terminals so tat the device can be plugged directly to pins provided on the motor. The material chosen for the electrically conductive contact coating on the PTC elements and that of the terminals and clip is such as to militate against breakdown or corrosion of the conductive coatings.

BRIEF DESCRIPTION OF THE DRAWINGS

In the following detailed description corresponding elements in the various views of the drawings are indicated by common reference numerals.

As seen in FIG. 1, switch 10 is mounted on a compressor 12, only partly shown. With particular reference to FIGS. 4-8, switch 10 comprises a casing member 14 which has a cup-shaped portion having a bottom wall 16 and a depending generally cylindrical side wall 18. The cup-shaped portion has an open end 20 for reception of one or more PTC switching elements to be discussed infra. A pair of notches 22, 24 are formed in the free distal end of wall 18 and ears 26, 28 protruding from the outer periphery of wall 18 are aligned so that each is directly below a respective notch. Each ear has a surface which tapers toward the slot to facilitate placement of a clip thereover, and preferably is provided with a groove on the opposite end of the ear to lockingly receive the clip as will be explained in greater detail below. A terminal receiving slot 30 is formed in the side wall near bottom wall 16 and may extend slightly into the bottom wall. Another slot 32 is formed in the bottom wall 16 in close proximity to the side wall and in alignment with notch 24 and ear 28.

Figure 1:
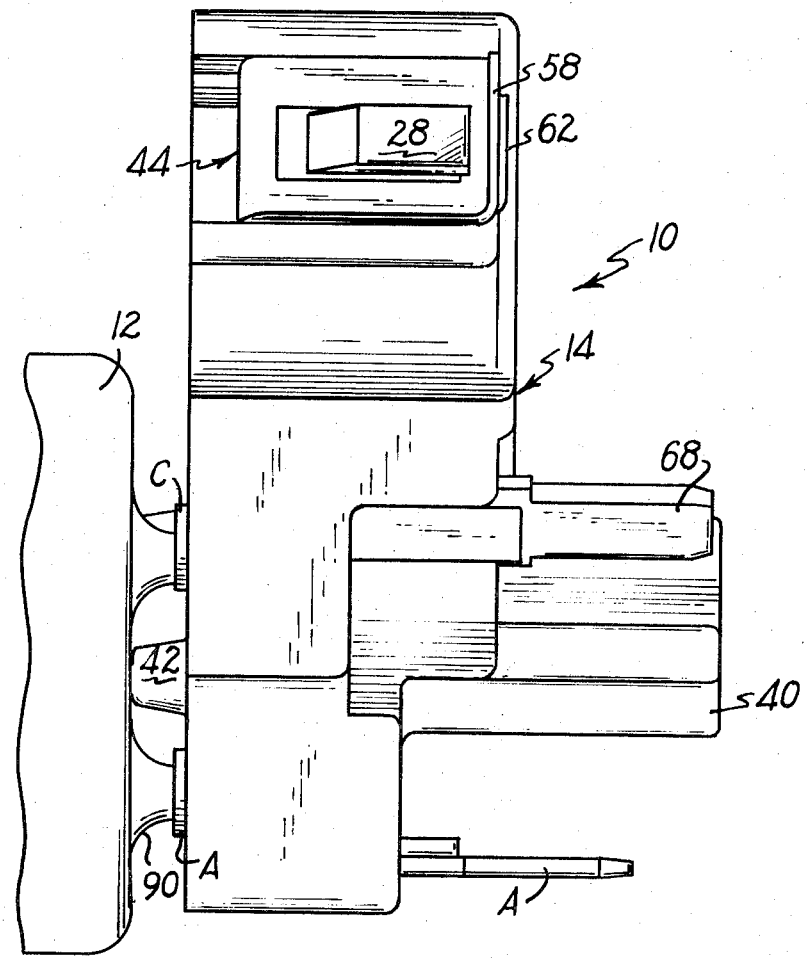
FIG. 1 is a front plan view of a switch made in accordance with the invention mounted on a compressor motor shown broken away.
Figure 2:
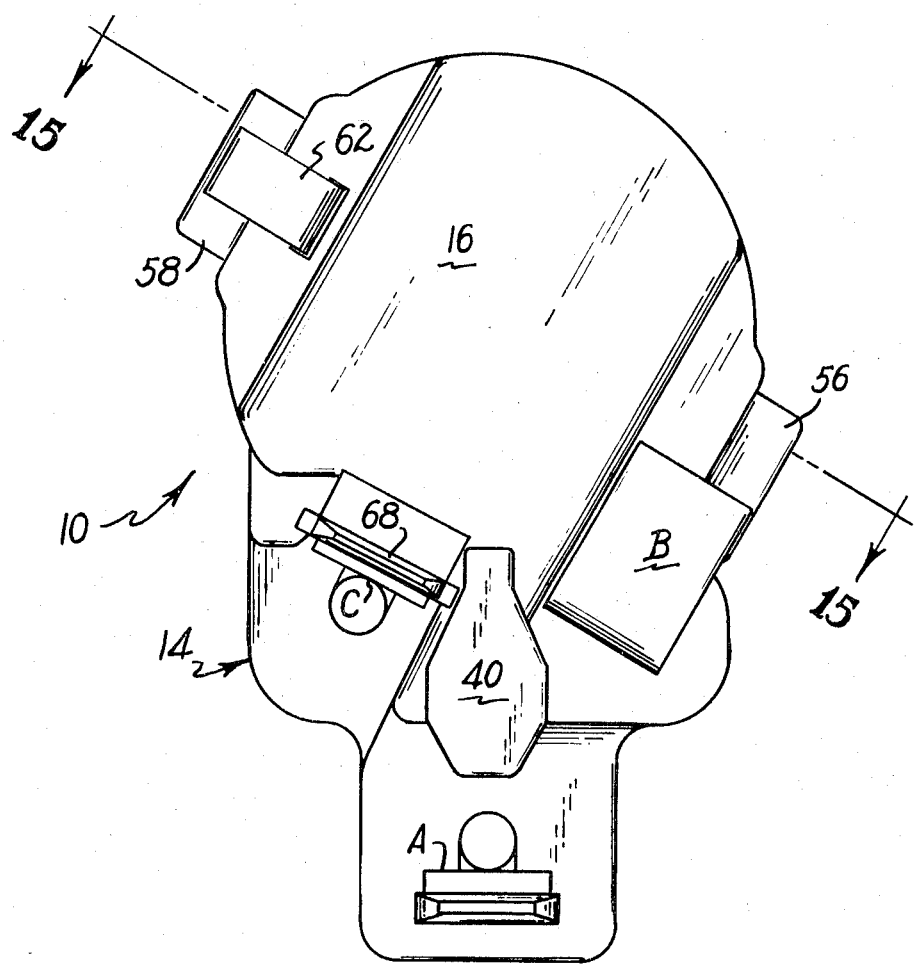
FIG. 2 is a right plan view of the FIG. 1 switch.
Figure 3:
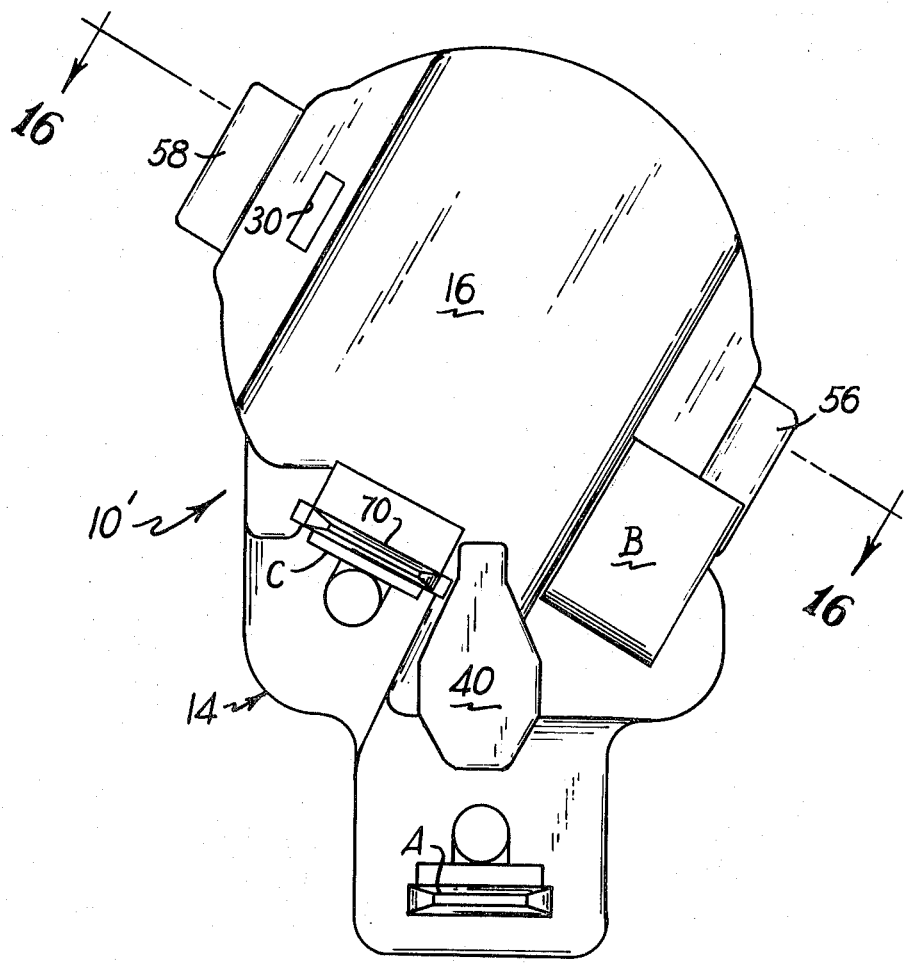
FIG. 3 is a right plan view similar to FIG. 2 of a second embodiment of the invention.
Figure 4:
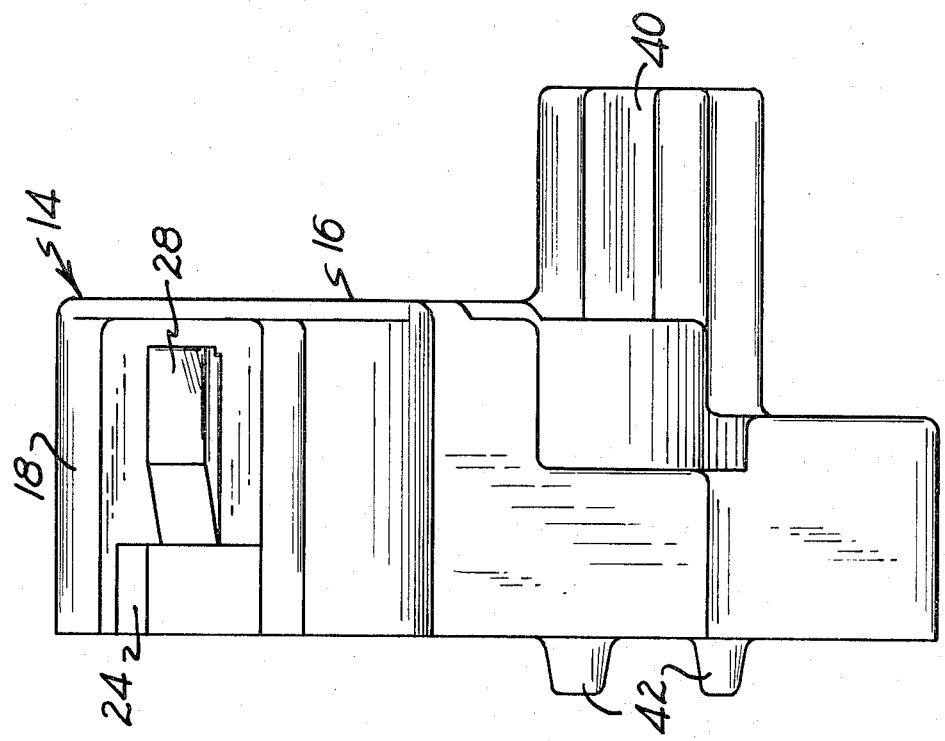
FIG. 4 is a front plan view of the switch casing.
Figure 5:
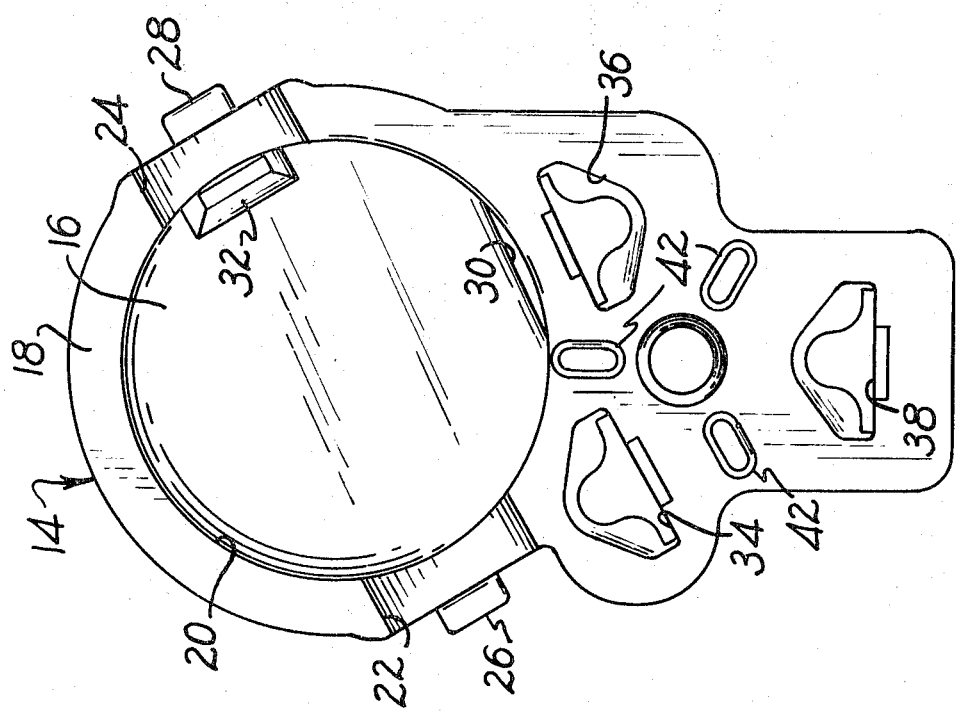
FIG. 5 is a left plan view of the FIG. 4 casing.
Figure 6:
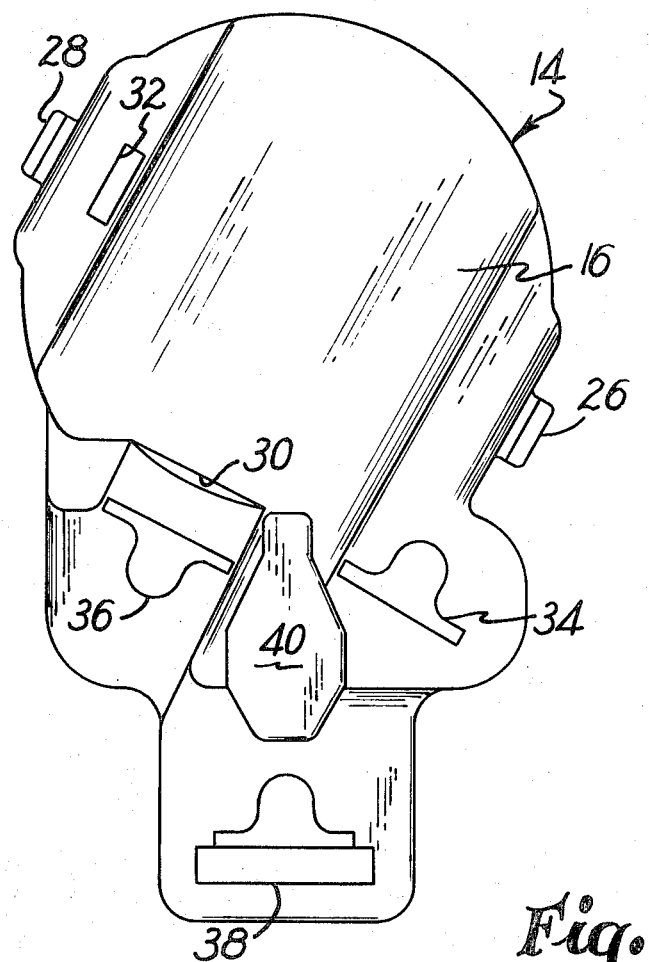
FIG. 6 is a right plan view of the FIG. 4 casing.
Figure 7:
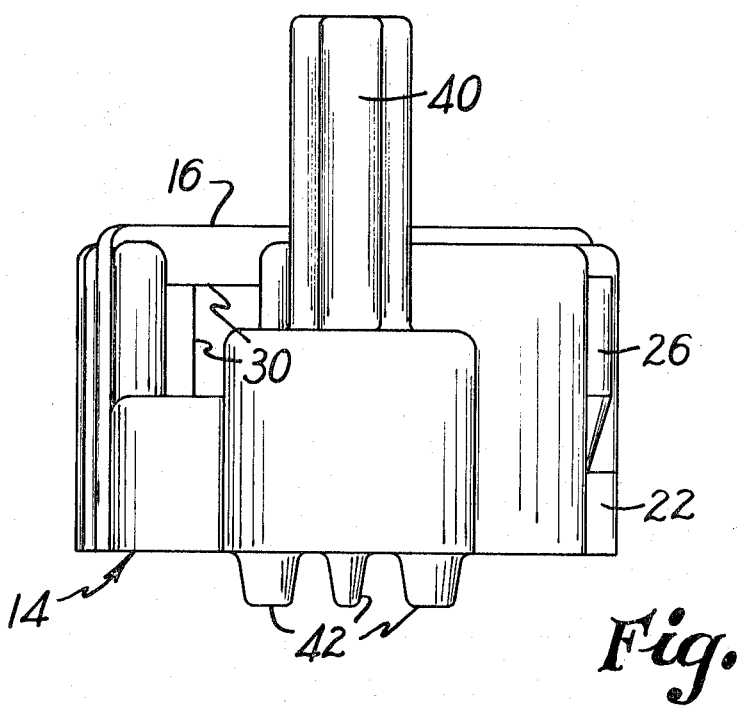
FIG. 7 is a bottom plan view of the FIG. 4 casing.
Figure 8:
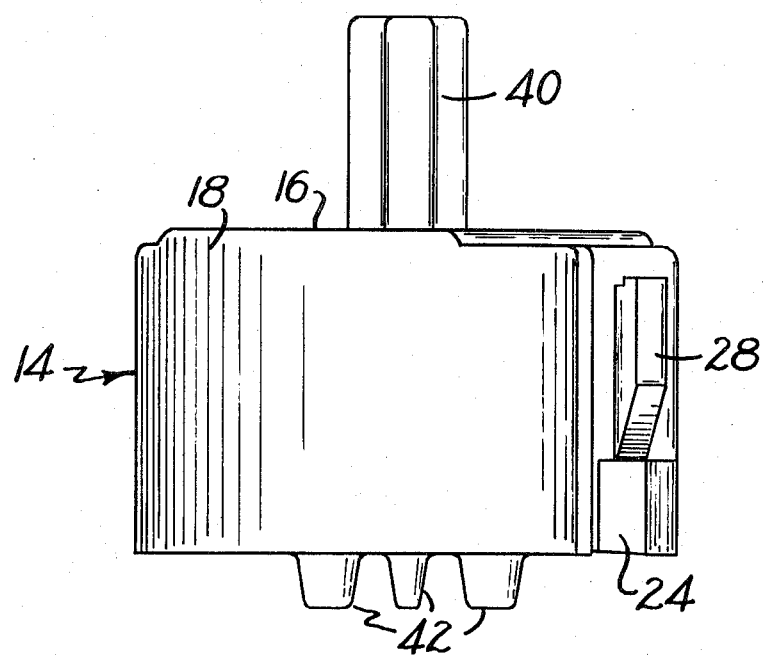
FIG. 8 is a top plan view of the FIG. 4 casing.

Casing member 14 is formed with a second pin receiving portion having pin receiving apertures 34, 36, 38 receiving therein respective female pin connectors B, C, A. A leg 40 depends from casing 14 and is used to push the device onto terminal pins of a motor. On the side of the casing remote from leg 40 a plurality of stop tangs 42 project from the casing adjacent the pin receiving apertures to limit motion of the casing when it is pushed onto the motor pins so that the pin connectors A, B, C will not contact the glass header portion surrounding the motor pins, as seen in FIG. 1.

Figure 9:
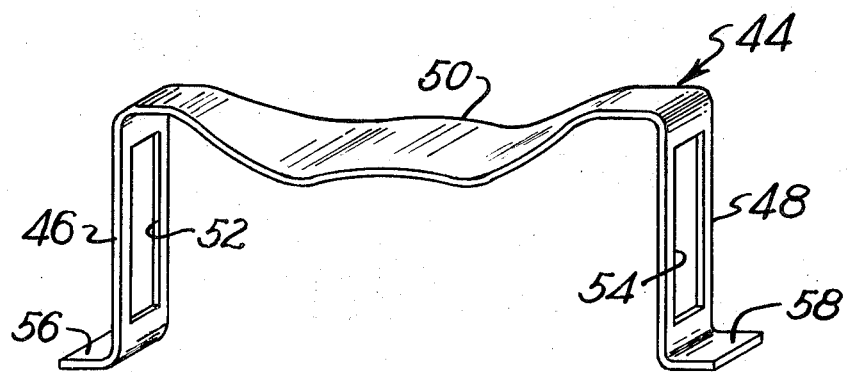
FIG. 9 is a perspective view of a spring contact receivable on the FIG. 4 casing.

Clip member 44, depicted in FIG. 9, is generally U-shaped having two leg portions 46, 48 depending from a bight portion 50 and is constructed of electrically conductive material having good spring characteristics. Bight portion 50 is formed with a plurality of laterally extending smooth wave like depressions to increase the area of contact with PTC elements disposed in the casing and to enhance the spring bias of the clip against the PTC elements. In general it is preferred that the surface of electrical connection with the PTC elements be as large as possible in order to lower current densities and prolong contact life. A slot 52 is formed in leg 46 and a similar slot 54 is formed in leg 48. Distal free end of legs 46, 48 are formed with laterally extending tabs 56, 58 respectively. Clip 44 is disposed over the open end 20 of casing 14 with slots 52, 54 received over ears 26, 28. It should be noted that preferably clip 44 does not entirely close the open end 20 to permit circulation of air therethrough.

Figure 10:
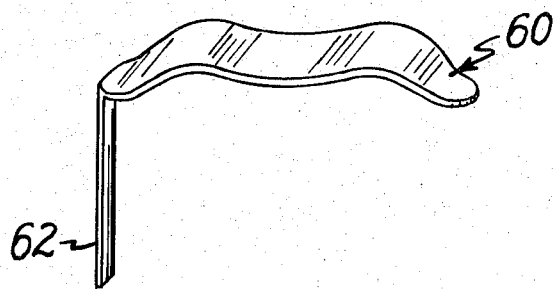
FIG. 10 is a perspective view of another spring contact employed in the FIG. 2 switch.

In FIG. 10 an electrical contact member 60 composed of electrically conductive material having good spring characteristics, is shown having a plate like member also formed with a plurality of laterally extending wave like depressions to improve electrical connection with the PTC elements and is provided with a downwardly extending arm 62. Contact member 60 is received on bottom wall 16 with arm 62 extending through slot 32, however as described below is used only in certain embodiments of the invention.

Figure 11:
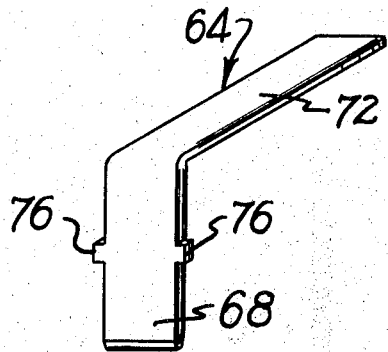
FIG. 11 is perspective view of a combination terminal-contact employed in the FIG. 2 switch.
Figure 12:
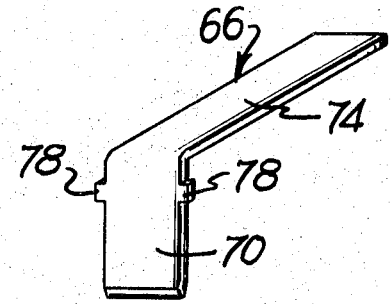
FIG. 12 is a perspective view of a combination terminal-contact employed in the FIG. 3 switch.

Two different contact-terminals 64, 66 are shown in FIGS. 11 and 12 respectively. Terminals 64, 66 are both generally L-shaped with respective legs 68, 70 formed into bayonet type terminals. Respective legs 72, 74 serve as contact elements and are adapted to extend into casing 14 with the terminal portion projecting out through slot 30. Laterally extending tabs 76 formed in contact terminal 64 are further removed from leg 72 than corresponding laterally extending tabs 78 in contact-terminal 66. Tabs 76 and 78 are received on the bottom wall surface 16 and limit inward movement of the respective contact terminal. Thus, contact leg 72 will be spaced further from the inside surface of bottom wall 16 than leg 74. Choice of which contact terminal member to be used depends on the desired mode of operation, as explained below.

Figure 13:
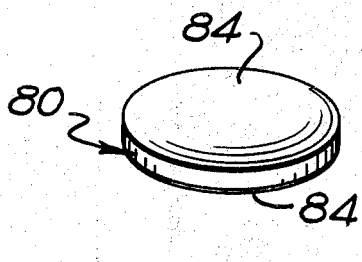
FIG. 13 is a perspective view of a PTC element employed in the FIG. 2 and FIG. 3 switches.
Figure 14:
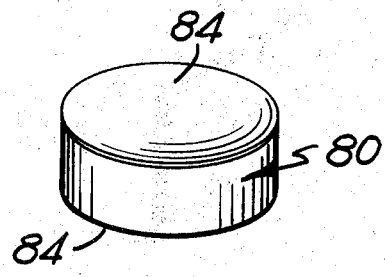
FIG. 14 is a perspective view of a PTC element employed in a switch similar to FIG. 3.

FIGS. 13 and 14 show two different generally disk shaped PTC elements 80 and 82 respectively. It will be noted that element 82 is considerably thicker than 80, preferably twice as thick. The PTC elements possess a resistance characteristic having a positive temperature coefficient and a sharply defined transition temperature above which the resistance of the elements increases relatively abruptly. Typical examles of such PTC elements may be fabricated of barium titanate doped with a rare earth such as lanthanum. Each element is provided with an electrically conductive contact coating 84 on opposite faces of any suitable electrically conductive material and suitably applied by flame spraying, plating, silk screening, spraying or the like.

Figure 15:
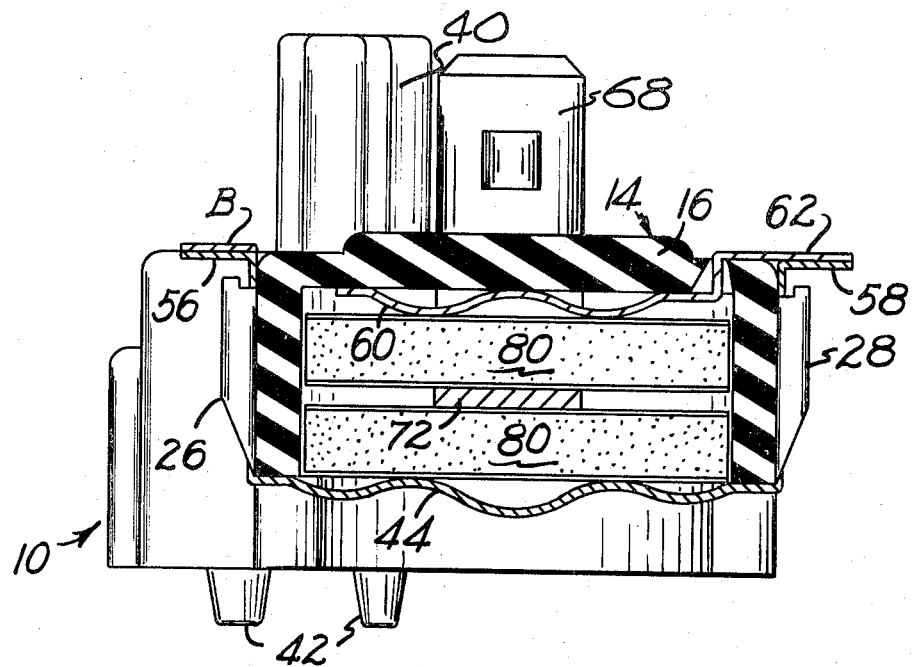
FIG. 15 is a cross sectional view taken on lines 15—15 of FIG. 2.

For one mode of operation, as seen in FIG. 15, two PTC elements are received in casing 14 separated by contact leg 72 of contact-terminal 64. Spring contact member 60 is received between one PTC element 80 and wall 16 with arm 62 extending through slot 30 and fixedly attached to tab 58 of clip 44, as by welding. The other tab 56 of clip 44 is similarly attached to an extension of pin connector B which connector is disposed in pin aperture 36. Terminal leg 68 of contact-terminal 64 is connected to connector C as by welding so that the PTC elements are connected in parallel circuit relationship. Thus the circuit path may be traced from pin connector B to tab 56, clip 44 with one branch going through one PTC element 80 to contact plate 72, and a second branch going to arm 62 to plate 60 and through the second PTC element 80 to contact plate 72 and then to terminal leg 68 and pin connector C. This mode of operation is particularly advantageous since it minimizes current density through the PTC contact coatings and hence improves contact life.

Figure 16:
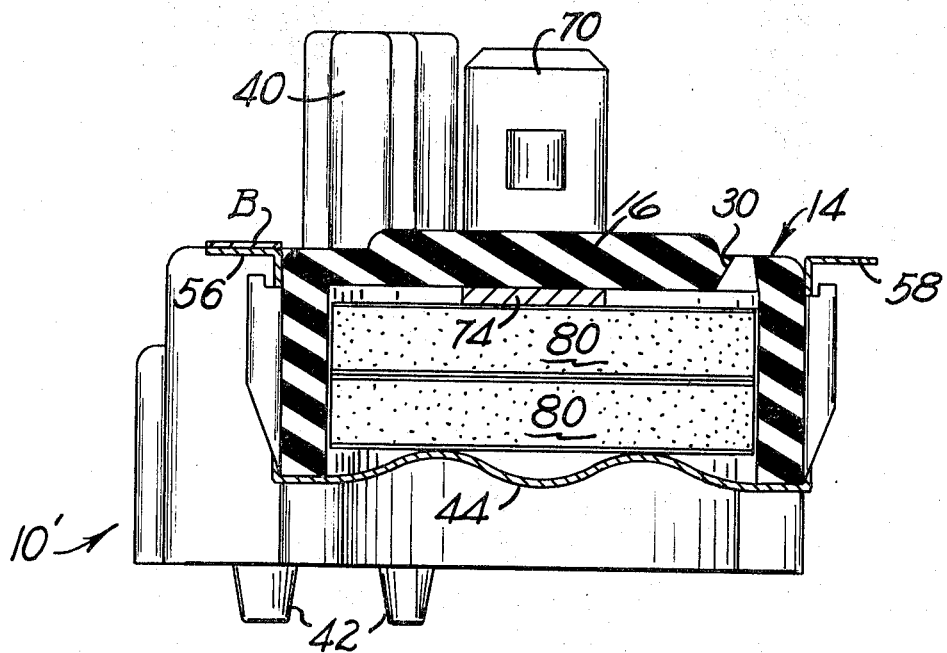
FIG. 16 is a cross sectional view taken on lines 16—16 of FIG. 3.

FIG. 16 depicts an alternate embodiment in which the two PTC elements 80 are arranged in series circuit relationships in switch 10. In this arrangement contact leg 74 is received between wall 16 and two abutting PTC elements 80. In this embodiment the circuit path runs from pin connector B to tab 56, clip 44 through both PTC elements 80 to contact plate 74, to terminal leg 70 and pin connector C.

Figure 17:
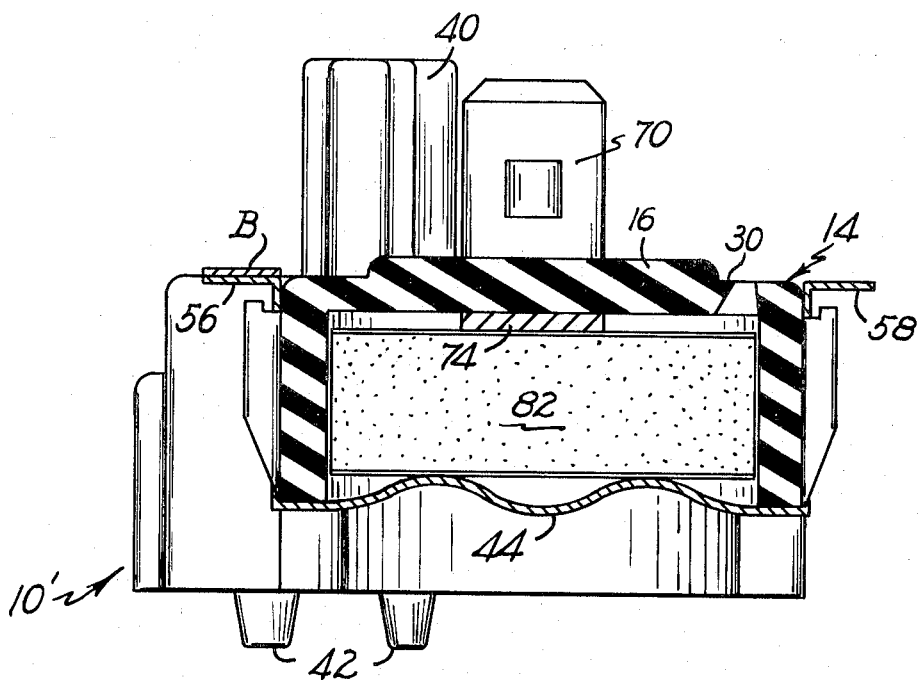
FIG. 17 is a cross sectional view similar to FIG. 16 but showing a single PTC element.

If desired a single PTC element can be employed as shown in FIG. 17. In this embodiment the same contact-terminal member is used as in the FIG. 16 embodiment. The electrical path is also the same as in the series connected elements, the two stacked PTC elements of FIG. 16 corresponding to the single thicker PTC element of FIG. 17. The remaining structure of FIGS. 16 and 17 are identical to that of FIG. 15 and hence need not be redescribed.

Figure 18:
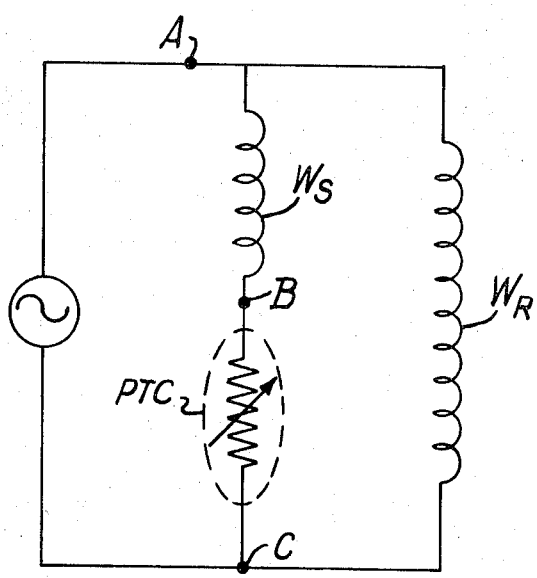
FIG. 18 is a schematic electrical circuit showing how the FIGS. 1-17 switches can be employed for starting an electric motor having a run and a start winding.

Terminal pin connector A need not be employed for applications in which a direct connection is made to the motor. FIG. 18 depicts how the switch of the instant invention may be employed. Pin connector A is connected to both the start winding $W_S$ and run winding $W_R$. Pin connector B is connected between the other side of the start winding $W_S$ and one side of the PTC elements. Pin connector C is connected to the other side of the PTC element and the run winding $W_R$. Thus upon initial application of power with the PTC element(s) in its low resistance mode current passes through the PTC elements and the start winding $W_S$ as well as through the run winding $W_R$. By the time the motor has reached its running speed the PTC element(s) has heated up and gone into its high resistance mode effectively deenergizing the start winding. The PTC element(s) is maintained in its high resistance mode as long as power is applied to the motor due to the voltage across terminal A C.

The materials chosen for electrically conductive coatings 84 on PTC elements 80, 82 and the elements in physical contact therewith e.g. members 44, 60, 72 and 74 are chosen so current is evenly distributed and with little or no resistive heating and so that any tendency to corrode is minimized. That is they are chosen so that the material for the coatings and the contacting members are either the same or are galvanically compatible to minimize any tendency of corrosion which would decrease the useful life of the device. Thus, for example, either silver, nickel or aluminum could be used for both the coatings and the contacting members. Alternatively, aluminum could be employed for the coatings and indium or cadmium for the contacting members.

By combining into the single clip member 44 the functions of electrical contacting, serving as a casing half and maintaining mechanical bias on the PTC elements improved yield is obtained since fewer parts are required and hence dimensional tolerances required to obtain the necessary force of the clip against the PTC element(s) is more easily achieved. Clip 44 does not completely enclose the open end of the casing so that cooling of the PTC elements is promoted and also provision is made for outgassing of organic vapors which otherwise would cause deterioration of the PTC characteristic.

Whe a motor has been started with a solid state switch made in accordance with the invention the PTC element(s) is maintained in the high resistance mode so that upon deenergization of the motor for any reason reenergization cannot be accomplished until the PTC element(s) cools and returns to its low resistance mode. Clip 44 allows circulation of air so that the PTC pills will cool at a desired rate, for example two minutes. Thus the switch is particularly useful when it is desired to provide a short time for the motor to cool after each deenergization such as compressor motors, oil burner motors, hot water circulating pump motors and the like.

A switch of the instant invention is advantageously small so that it can be plugged onto motors and will occupy no more or even less space than the mechanical relays it replaces.

Thus it will be seen from the above description that the several enumerated objects of the invention have been realized.

Although the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A solid state switch comprising a generally cup-shaped casing formed of electrically insulative material, the casing having a bottom wall and a side wall depending therefrom forming a switch cavity, the side wall having a distal free end forming an open end of the casing, two notches are formed in the distal free end portion of the side wall, two ears are formed on the outer peripheral surface of the side wall, one in alignment with each notch, an aperture is defined in a casing wall; electrically conductive means is disposed on the bottom wall in the switch cavity and extends from within the cavity through the aperture to a point outside the casing; electrical resistor means is disposed in the switch cavity in electrical connection with the electrically conductive means disposed on the bottom wall; an electrically conductive, generally U-shaped clip having first and second legs depending from a bight portion, the legs each provided with a slot, the clip is disposed over the open end of the casing with the casing ears projecting through respective leg slots, the bight extending through the notches and having a smooth surface biased against the electrical resistor means spaced from the electrically conductive means.

2. A solid state switch according to claim 1 in which the bight of the electrically conductive U-shaped clip is formed with a plurality of laterally extending smooth wave like depressions to increase the surface of contact engagement and enhance the bias of the clip against the electrical resistor means.

3. A solid state switch according to claim 1 in which the aperture in the casing wall is located in the bottom wall, the means disposed on the bottom wall comprises an electrically conductive plate formed of material having good spring characteristics, the plate is formed with a plurality of laterally extending smooth wave like depressions to increase the surface of contact engagement and enhance the bias of the plate against the electrical resistor means, and an arm depends from the plate and extends through the aperture in the casing bottom wall and is electrically connected to electrical terminal means.

4. A solid state switch according to claim 3 in which a second aperture is formed in a casing wall, the electrical resistor means comprises two disk-shaped elements each having two spaced faces, a face of one element in engagement with the electrically conductive plate, an electrically conductive contact plate is interposed between the two elements, the contact plate extends out of the casing through the second aperture and is connectable to an electrical source, and the electrically conductive clip is in engagement with the other element.

5. A solid state switch according to claim 1 in which the electrical resistor means comprises at least one generally disk-shaped element composed of material having a positive temperature coefficient of resistivity.

6. A solid state switch according to claim 5 in which the material is a doped barium titanate.

7. A solid state switch according to claim 5 in which the electrical resistor means comprises two generally disk-shaped elements.

8. A solid state switch according to claim 1 in which the means disposed on the bottom wall comprises a flat plate which extends substantially across the switch cavity.

9. A solid state switch according to claim 1 in which the second aperture is formed in a casing wall and an electrically conductive plate extends substantially across the switch cavity spaced from the bottom wall, the conductive plate also extending through the second aperture and electrically connected to electrical terminal means, the electrical resistor means comprising two electrical resistors, the conductive plate being interposed between and in electrical connection with the two electrical resistors.

10. A solid state switch according to claim 1 in which the casing is formed with a portion mounting female connectors for terminal pins, one female connector electrically connected to the electrically conductive clip, another female connector electrically connected to a portion of the means disposed on the bottom wall which is disposed outside the switch cavity.

11. A solid state switch according to claim 10 in which bayonet terminals project from the female connectors below the bottom wall of the casing, the casing is provided with a leg depending from the bottom wall extending beyond the bayonet terminals to facilitate pushing of the switch onto terminal pins.

12. A solid state switch according to claim 11 including a plurality of stop surfaces projecting from the casing adjacent the female connectors to limit motion of the switch onto terminal pins.

13. A solid state switch according to claim 10 in which the legs of the U-shaped clip have laterally extending tabs at their face distal ends, the said one female connector having a portion extending therefrom welded to one of the tabs of the clip.

14. A solid state switch according to claim 1 in which the casing is formed with a portion mounting female connectors for terminal pins, the legs of the U-shaped clip having laterally extending tabs at their free distal ends, one female connector having a portion extending therefrom welded to one of the tabs of the clip, the other clip tab welded to a portion of the means disposed on the bottom wall which is disposed outside the switch cavity, the electrical resistor means comprising two stacked resistor elements, electrical contact means interposed between the two resistor elements and electrically connected to another female connector.

15. A solid state switch comprising a casing having first and second portions, a plurality of apertures in the first portion, female pin connectors received in the respective apertures, a second portion defining a switch cavity and having an open end, disk-like means having a positive temperature coefficient of resistivity received in the cavity, an electrically conductive clip received over the open end of the second portion and biased against the disc-like means, and means electrically connecting the clip and a portion of the disc-like means spaced from the clip to respective female pin connectors.

* * * * *